United States Patent [19]

Rydzak

[11] Patent Number: 5,256,835
[45] Date of Patent: Oct. 26, 1993

[54] SOFTWARE CONTROL OF A WEIGH AND FEED TRANSPORT IN A WEIGHING MODULE

[75] Inventor: Stanley Rydzak, Brookfield, Conn.

[73] Assignee: Pitney Bowes Inc., Stamford, Conn.

[21] Appl. No.: 922,892

[22] Filed: Jul. 31, 1992

[51] Int. Cl.⁵ .................... G01G 19/00; G01G 19/40
[52] U.S. Cl. ................................ 177/145; 177/25.15
[58] Field of Search .............................. 177/25.15, 145

[56] References Cited

U.S. PATENT DOCUMENTS

| | | | |
|---|---|---|---|
| 4,049,068 | 9/1977 | Kavanagh et al. | 177/25.15 |
| 4,844,188 | 7/1989 | Pirc et al. | 177/145 |
| 4,903,788 | 2/1990 | Cordery et al. | 177/145 X |
| 5,109,937 | 5/1992 | Kipp | 177/145 |
| 5,190,115 | 3/1993 | Dolan et al. | 177/25.15 |

*Primary Examiner*—George H. Miller, Jr.
*Attorney, Agent, or Firm*—Robert H. Whisker; Melvin J. Scolnick

[57] ABSTRACT

A transport apparatus for a weighing module includes a scale which has a deck connected to a scale base for weighing an object placed on the deck. The deck has slots for accommodating dual thickness belts which are arranged below the deck to be in substantial registration with the slots. The belts are positioned with respect to the slot such that in a home position a thinner section of the belt does not protrude through the slot whereby the transport means does not interfere with weighing of the object on the deck. When the belts are actuated, the dual thickness belts move so that a thicker section of each belt protrudes through the slot as the belts are being driven to thereby lift the object from the deck onto the thicker section of the belt to transport the object on the belt. In order to provide a safety factor in the event that something is caught in the belts in order to detect problems in the operation of the belts, the belts are monitored using a photodetector for measuring the actual travel time of the belt and comparing it to an expected time. The detector makes use of the slots in the belt to check the transitions between slot and tooth.

8 Claims, 4 Drawing Sheets

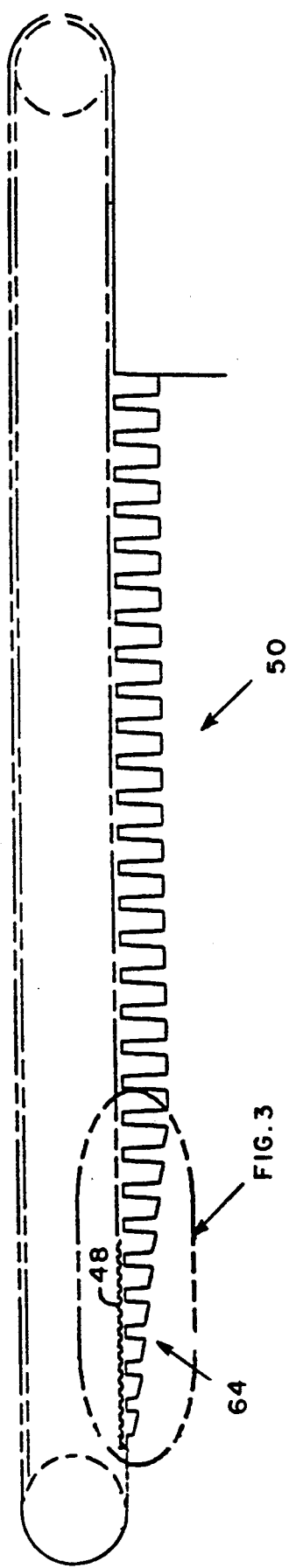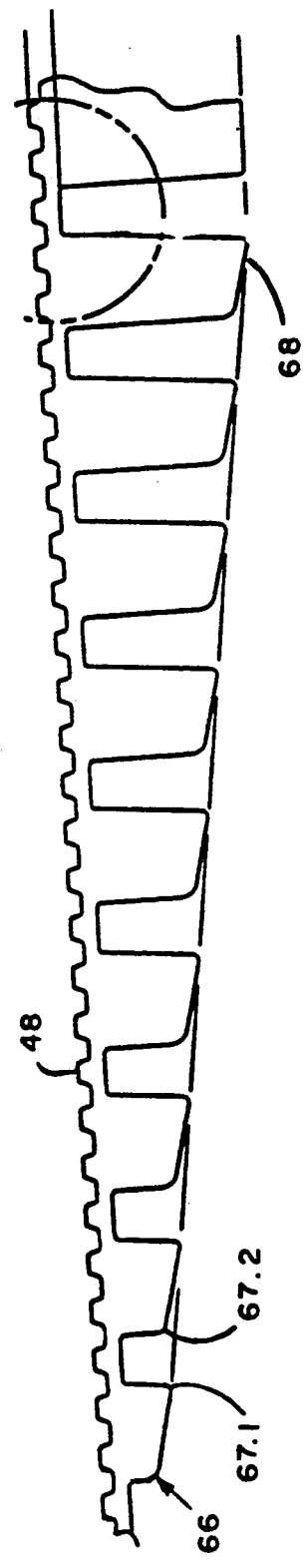
FIG. 2
FIG. 3

SOFTWARE CONTROL OF A WEIGH AND FEED TRANSPORT IN A WEIGHING MODULE

FIELD OF THE INVENTION

The invention relates to weighing modules and more particularly to scales having associated transport means for transporting a document or mailpiece.

BACKGROUND OF THE INVENTION

Weighing modules for use in conjunction with electronic postage meters are well known. The modules receive mailpieces and weigh them to derive a signal for setting the postage meter value to print the required amount of postage for a given weight mailpiece. When the weighing module is a part of a complete system, the speed with which the scale can weigh and transport mailpieces becomes a very important criterion for rating the system. The known methods of transport of mailpieces from the scale platform have become more and more complex as the need to reduce the tare weight to reduce susceptibility to ground vibration and at the same time addressing the need to increase the efficiency of mailpiece throughput are confronted.

U.S Pat. App. Ser. No. 923,407 entitled "SCALE HAVING VARIABLE THICKNESS DOCUMENT FEED BELT" filed on even date herewith and assigned to the assignee of the present invention specifically incorporated by reference herein teaches a transport apparatus for a scale in which an object on the scale is transported off the scale by way of a moving set of dual thickness belts where the thicker section of the moving belts protrude through slots on the upper deck of the scale to convey the object to the next module. Such moving belts are required to have some safety features if they are to operate well.

SUMMARY OF THE INVENTION

It is an object of the invention to provide a scale having a software controlled mailpiece transport apparatus which will stop the transport motor in the event that something is caught in the belts.

These and other objects may be accomplished by providing a transport apparatus for a scale, the scale comprising a deck connected to a weighing mechanism for weighing an object placed on the deck, said deck having at least one slot therein; the transport apparatus comprising a dual thickness belt arranged below said deck in substantial registration with the slot and means for driving said belt, said belt being positioned with respect to the slot such that in a home position a thinner section of the belt does not protrude through the slot whereby the belt does not interfere with weighing of the object on said deck, said means for driving said belt being operative to drive said dual thickness belt such that a thicker section of the belt protrudes through said slot as said dual thickness belt is being driven to thereby lift the object from the deck onto said thicker section of the belt to transport the object on the belt, detector means in the transport apparatus for monitoring the velocity of the belt, and means connected to said detector means for shutting off said driving means in the event that the travel time of the belt is too slow.

In another aspect of the invention there is provided a method for transporting a mailpiece from a scale deck comprising the steps of providing a plurality of slots in the deck; providing a corresponding plurality of driven dual thickness belts below said deck and in substantial registration, respectively, with the slots; weighing the mailpiece while the thinner sections of the belts are in a position wherein the belts do not protrude through the slots and thereby do not interfere with the weighing step; and thereafter actuating the belts to move such that the thicker portion protrudes through the slots to lift the mailpiece and transport it as the belts move; monitoring the movement of the belts to determine the speed thereof; comparing the speed of movement to an expected speed; and shutting off the belt actuator in the event that the movement is too slow.

BRIEF DESCRIPTION OF THE DRAWING

FIG. 2 is a view of the preferred embodiment of a belt for use with the belt drive of FIG. 1.

FIG. 3 is detail of the taper shown in FIG. 2.

DESCRIPTION OF THE PREFERRED EMBODIMENT

Figure 1:
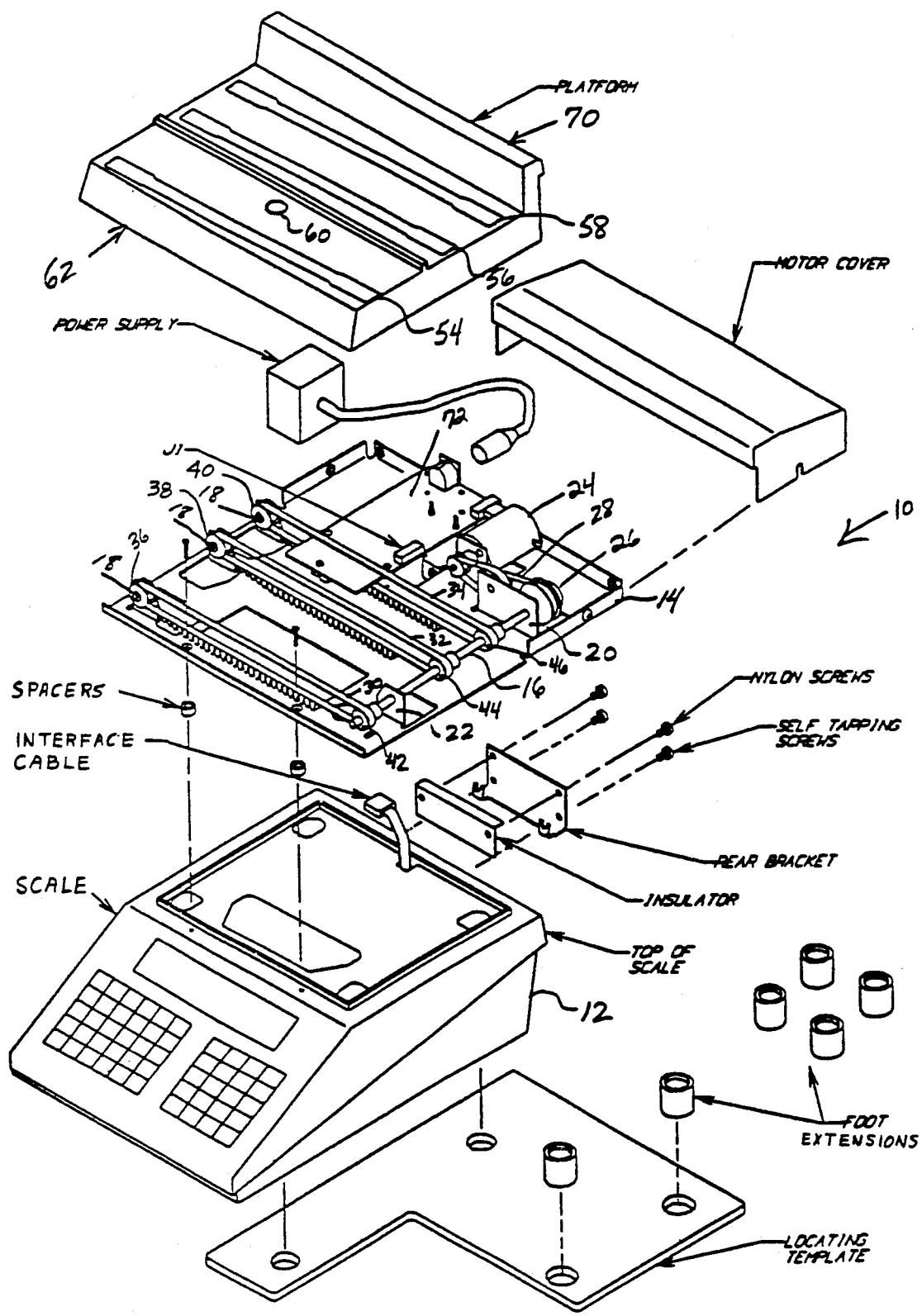
FIG. 1 is an exploded perspective view of a scale and a transport system in accordance with the invention.

In FIG. 1, there is shown generally at 10 in an exploded perspective view, a weighing module which includes a scale comprising base unit 12 on which belt transport assembly frame 14 is mounted using suitable known fasteners such as screws. Shaft 16 is mounted on flanges 20 and 22 at one side of the frame and studs 18 are mounted in flanges (not easily visible) on the other side. DC motor 24 is mounted for driving pulley 26 affixed to shaft 16 through timing belt 28. It will be appreciated that the drive may be accomplished by means of gears or other known drive transmission devices if desired. In the preferred embodiment, the shafts are mounted using ball bearings to minimize friction and allow the use of a minimum power DC motor to power the transport.

Three belts 30, 32, and 34 respectively are mounted on timing pulleys 36, 38, and 40 on shaft 16 and timing pulleys 42, 44, and 46 on shaft 18. Each of the belts, one of which is illustrated in FIG. 2, comprise a timing belt having timing teeth 48 on the interior and a plurality of lugs or teeth 50 which are slightly separated from each other by notches 51 disposed over a predetermined section of the belt forming thereby a dual thickness belt having a thinner section without the lugs and a thicker section formed by the lugs. It will be appreciated that the number of belts required is dependent upon the size of the mailpieces to be accommodated.

Turning again to FIG. 1, top deck 52 having slots 54, 56, and 58 which are in substantial registration with the belts fits over the transport assembly frame 14 such that in the home position, that is with the thinner side of the belts being up, the belts 30, 32, and 34 do not protrude through the respective slots 54, 56, and 58 so as not to interfere with the weighing of an object such as a document or mailpiece placed on the top deck 52. When it is desired to transport the mailpiece from the top deck 52 to, for example, a subsequent module such as a mailing machine, the drive motor 24 is actuated to drive the belts and therefore the lugs of the belts 30, 32, and 34 which form the thicker section of the belts move to the top where they protrude through the top deck 52, thereby lifting any mailpiece on the deck 52 onto the lugs 50 and moving it as the belts continue to move.

Levelling bubble 60 is mounted in the top deck 52 to facilitate leveling of the scale. Snap grip posts, one of which is illustrated at 62, are affixed to the top deck 52. The bottom of post 62 is designed to easily snap into and out of the spider incorporated in base unit 12. The details of a preferred spider and the operation of a scale may be found in U.S. Pat. App. Ser. Nos. 745,304 and 774,004 entitled "LOAD CELL SUPPORTING MEMBER AND WEIGHING SCALE INCORPORATING THE SAME" assigned to the assignee of the present invention and herewith specifically incorporated by reference herein.

Turning again to FIG. 2, as mentioned previously, in the home position, that is when weighing is taking place, the thin portion of each belt is uppermost as seen in the position of the belt illustrated in FIG. 2. It will be appreciated by those skilled in the art that the teeth or lugs 50 may all be of the same height, however for best results, it has been found that as illustrated in FIG. 2 and in the expanded section shown in FIG. 3, an initial group of lugs indicated generally at 64 may be tapered in height and in cross-section such that the profile of the lugs grades smoothly from lug 66, the top of which is only slightly above the surface of the thin portion of the belt, to lug 68, which is nearly the height of the remainder of the lugs 50. The lugs 64 form a tapered transition zone between the thinner and thicker sections of the belt. The tapered transition lugs serve to assure that a mailpiece is smoothly lifted from the deck 52 and is not simply pushed along by the first lug to protrude through the slot in the deck 52. In addition, it is preferable that the trail edge of a lug 67.1 (FIG. 3) is slightly above the lead edge 67.2 of the following lug further assuring that there will not be a vertical surface that strikes the trail edge of a mailpiece as the belts begin to engage with the mailpiece. It is important to smoothly start and transport the mailpiece in order not to cause it to skew.

In the preferred embodiment, the belts and slots are skewed at a slight angle as seen in FIG. 1 to provide an alignment of the mailpiece as it leaves the scale. Since the belts are skewed, the mailpiece is continually urged toward the realignment wall 70 as the belts convey it toward the next module. In the preferred embodiment, the transport belt speed is about 30 inches/second to match the velocity of the downstream mailing machine at maximum voltage to the DC motor 24.

Figure 4:
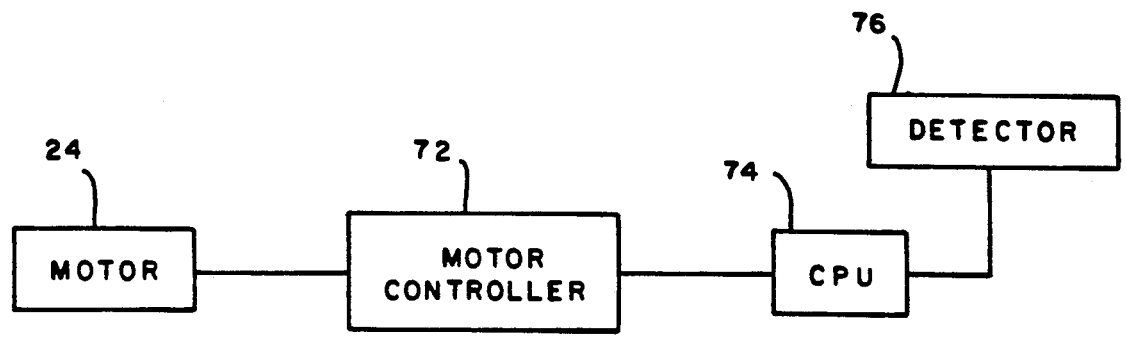
FIG. 4 is a schematic representation of the electrical connection between the CPU of the scale, the motor controller, and the motor for driving belts of the transport.
Figure 6:
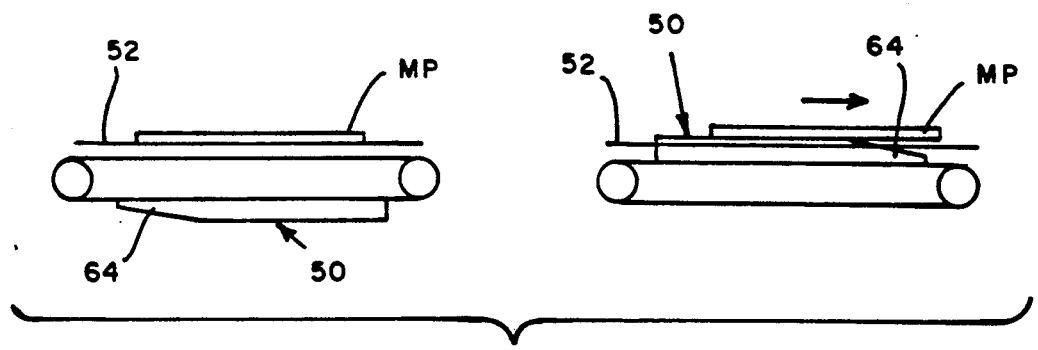
FIG. 6 is a schematic illustration of the operation of the transport system.

Motor controller board 72 comprises a conventional control for motors of the type known in the art connected for control of the DC motor 24 in accordance with a novel program preferably operating in conjunction with the scale CPU 74 (shown in FIG. 4) and with timing signals developed from the belt LED/Photodetector assembly shown at 76.

Figure 5:
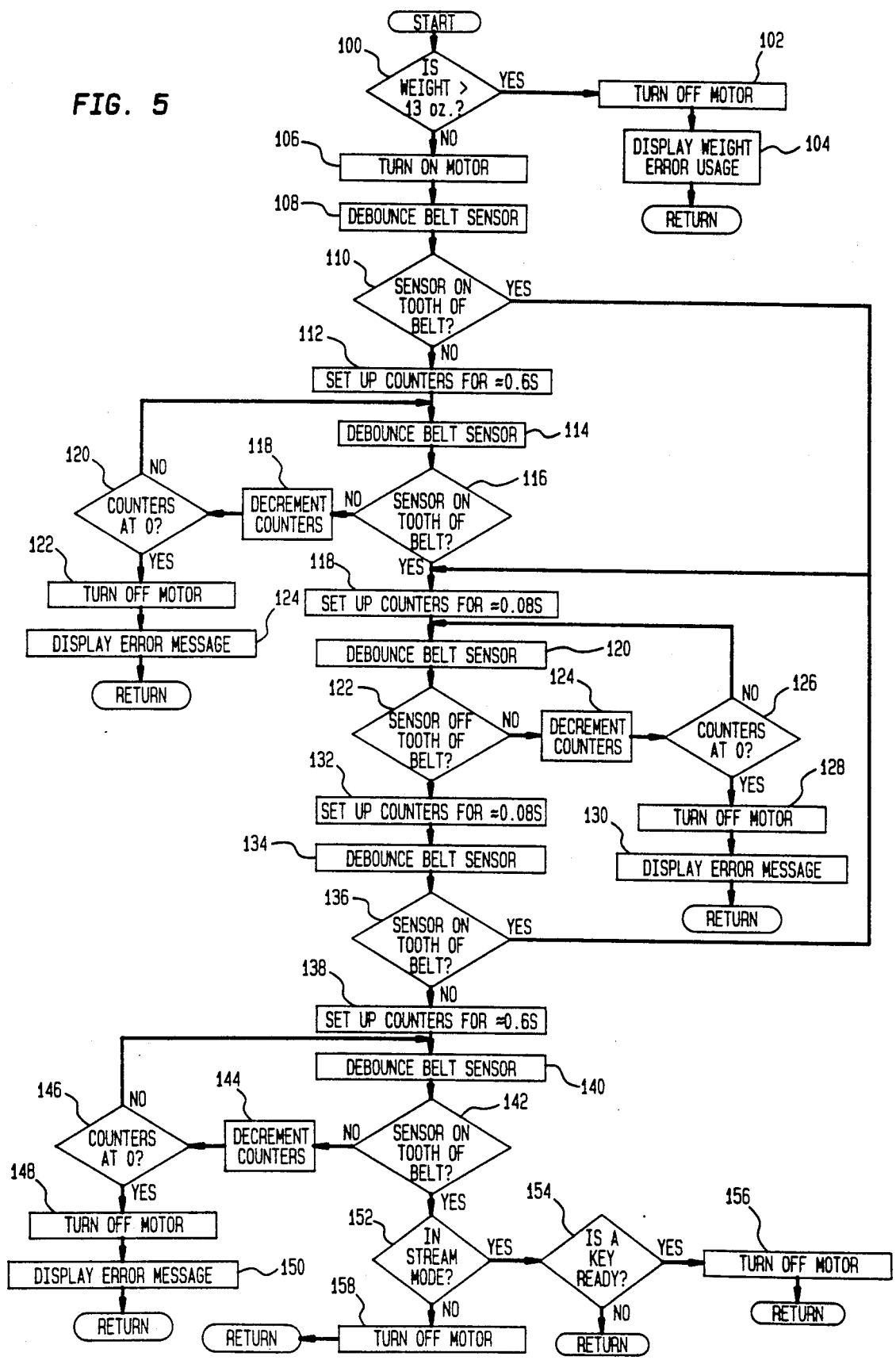
FIG. 5 is a flow chart of the operation of the transport system including a motion sensing system in accordance with the invention.

FIG. 5 is a flow chart of the control of the scale transport in accordance with the invention. At the start of the routine, the weight is checked to make sure that the weight is less than 13.0 oz, block 100. It will be appreciated that other limits may be utilized, however the one chosen here matches, for example, the 12 oz. weight limit of Pitney Bowes Model 6200 mailing machine. Other mailing machines may, of course, require different limits. If the weight is over the limit, the YES branch turns off the motor, block 102, displays an error message, block 104, and returns. Preferably, the motor is kept in the OFF state and error displayed until the weight is removed or replaced with an object having a weight less than 13 oz. Thus if an operator places his hand on the platform with a sufficient amount of force, the motor will be turned off and the error message displayed.

If the weight is less than 13 oz. or less than the desired limit, the motor controller 72 is enabled and the motor 24 turned on, block 106. Preferably, the belt sensor input from sensor 76 is monitored and debounced, block 108, to filter any noise in the sensor circuit. The belt teeth alternate with the notches or thin parts so that the position of the teeth of the belt with respect to the sensor at decision block 110. If it is not on a tooth, a time out is setup in a counter, block 112. Conveniently, the timeout in this case is 600 milliseconds. It will be appreciated that the exact timeout may be determined by simple tests and an extra amount included to take care in variations from unit to unit. Thus, the sensor continues to be monitored and debounced, block 114, to see if the sensor detects the presence of a tooth of the belt, block 116, and if NO, the counter is decremented, block 118, and the program loops back until the counter reaches 0, decision block 120, the YES branch from block 120 causes the motor to turn OFF, block 122, and displays an error message, block 124, and returns.

If the sensor detects the presence of the next tooth at block 116, the counters are set for 80 milliseconds for the transition from tooth to gap or thin space, block 118. In the event that the sensor already detected the presence of a tooth at block 110, the YES branch falls to block 118 as well. In similar fashion as described previously, the sensor is continually monitored and the output debounced, block 120 at each check, block 122, to see whether the tooth had moved. If NO the counter is decremented, block 124, and loops back from decision block 126 until the counter reaches 0. At that point, the motor is turned OFF, block 128, an error message displayed, block 130, and the program returns.

If the sensor detects the transition at 122, the YES branch falls to block 132 to set up counter for 80 milliseconds, the sensor debounced at block 134, and the determination made at decision block 136 if the transition has been made to the thin part of the belt. If YES on the tooth part of the belt having teeth, the routine loops back to block 118. If NO, because the thin part of the belt has reached the sensor, the counter is set for 600 milliseconds, block 138. A check is made at decision block 142 as to whether a tooth has been detected. If not, one revolution has not been accomplished yet and the counter is decremented, block 144, and if the counter has not reached 0, the routine loops back to block 140 from decision block 146. If timeout occurs, the motor is turned off, block 148, and an error message displayed, block 150.

At block 142, if the tooth is detected, one revolution has been completed, and a check is made to see if the operation is in the stream mode, decision block 152, If YES, a check is made as to whether a key is ready, decision block 154, and if YES, the motor is turned OFF, block 156. If no key is ready the routine simply returns. If at block 152, it is determined that the system is in the weigh and feed mode, the NO branch turns off the motor, block 158.

Thus the velocity of the belts is monitored by assuring that each of the transitions occurs within an expected time and if this is not the case the motor is shut off.

It will be appreciated from the foregoing that the time out based on the monitoring of transitions allows other problems in addition to jams to be detected. The slowdown due to such things as power supply or motor failure or in the control hardware and sensors will also show up with the monitoring of the velocity of the belt in accordance with the invention.

Those skilled in the art will recognize that the above descriptions and the attached drawings have been provided by way of illustration only and that numerous other embodiments of the subject invention will be apparent to those skilled in the art from consideration of the above description and the attached drawings. Accordingly limitations on the scope of the subject invention are to be found only in the claims set forth below.

What is claimed is:

1. A transport apparatus for a scale, the scale comprising a deck connected to a scale base for weighing an object placed on the deck, the deck having at least one slot therein; the transport apparatus comprising a dual thickness belt arranged below the deck in substantial registration with the slot and means for driving said dual thickness belt, the dual thickness belt being positioned with respect to the slot such that in a home position a thinner section of the belt does not protrude through the slot whereby the belt does not interfere with weighing of the object on the deck, the means for driving the dual thickness belt being operative to drive the dual thickness belt such that a thicker section of the belt protrudes through the slot as the dual thickness belt is being driven to thereby lift the object from the deck onto the thicker section of the belt to transport the object on the belt, detector means in the transport apparatus for monitoring the velocity of the belt, and means connected to the detector means for shutting off the driving means in the event that the travel time of the belt is too slow.

2. The apparatus of claim 1, wherein the thicker section of the belt comprises a plurality of teeth separated by notches such that the detector is operative to monitor the transitions between the teeth and notches and wherein the time to transition is compared with an expected time to determine whether the travel time of the belt is too slow.

3. A method for transporting a mailpiece from a scale deck comprising the steps of providing a plurality of slots in the deck; providing a corresponding plurality of driven dual thickness belts below the deck and in substantial registration, respectively, with the slots; weighing the mailpiece while the thinner sections of the belts are in a position wherein the belts do not protrude through the slots and thereby do not interfere with the weighing step; and thereafter actuating the belts to move such that the thicker portion protrudes through the slots to lift the mailpiece and transport it as the belts move; monitoring the movement of the belts to determine the speed thereof; comparing the speed of movement to an expected speed; and shutting off the belt actuator in the event that the movement is too slow.

4. The method of claim 3, wherein the thicker portion of the belt comprises a plurality of teeth respectively separated by notches.

5. The method of claim 4, wherein the step of monitoring the movement of the belt comprises is accomplished using a detector for detecting transitions between the teeth and the notches.

6. The method of claim 5, wherein the the step of comparing the speed of movement to an expected speed comprises the steps of determining an expected time to the next transition and comparing the actual time to the expected time.

7. A weighing module comprising a scale including a deck connected to a scale base for weighing a mailpiece placed on the deck, the deck having a plurality of slots therein; a transport apparatus, the transport apparatus comprising a plurality of dual thickness belts respectively corresponding to the slots in the deck of the scale, the belts being arranged below the deck in registration with the slots; and, means for driving the belts, the belts being positioned with respect to the slots such that in a home position thinner sections of the respective belts do not protrude through the slots whereby the transport means does not interfere with weighing of the mailpiece on the deck, the means for driving the belt being operative to drive the dual thickness belt such that a thicker section of the belt protrudes through the slot as the dual thickness belt is being driven to thereby lift the mailpiece from the deck onto the thicker section of the belt to transport the mailpiece on the belt, detector means in the transport apparatus for monitoring the velocity of the belt, and means connected to the detector means for shutting off the driving means in the event that the travel time of the belt is too slow.

8. The apparatus of claim 7, wherein the thicker section of the belt comprises a plurality of teeth separated by notches such that the detector is operative to monitor the transitions between the teeth and notches and wherein the time to transition is compared with an expected time to determine whether the travel time of the belt is too slow.

* * * * *